No. 687,773. Patented Dec. 3, 1901.
H. F. NOYES.
AIR BRAKE.
(Application filed Dec. 19, 1894. Renewed Feb. 27, 1897.)

(No Model.)

WITNESSES
Robert E. Meredith
Estella Akin

INVENTOR
Henry F. Noyes though it into the atmosphere. In going
UNITED STATES PATENT OFFICE.

HENRY F. NOYES, OF ELGIN, ILLINOIS, ASSIGNOR TO WESTINGHOUSE AIR BRAKE COMPANY, OF PITTSBURG, PENNSYLVANIA, A CORPORATION OF PENNSYLVANIA.

AIR-BRAKE.

SPECIFICATION forming part of Letters Patent No. 687,773, dated December 3, 1901.

Application filed December 19, 1894. Renewed February 27, 1897. Serial No. 625,393. (No model.)

*To all whom it may concern:*

Be it known that I, HENRY F. NOYES, of Elgin, Kane county, Illinois, have invented certain new and useful Improvements in Air-Brakes, of which the following is a specification.

The object of my invention is to provide a simple, economical, and efficient valve especially adapted for use in connection with air-brake systems, and especially the Westinghouse system; and the invention consists in the features and combinations hereinafter described and claimed.

Figure 1:
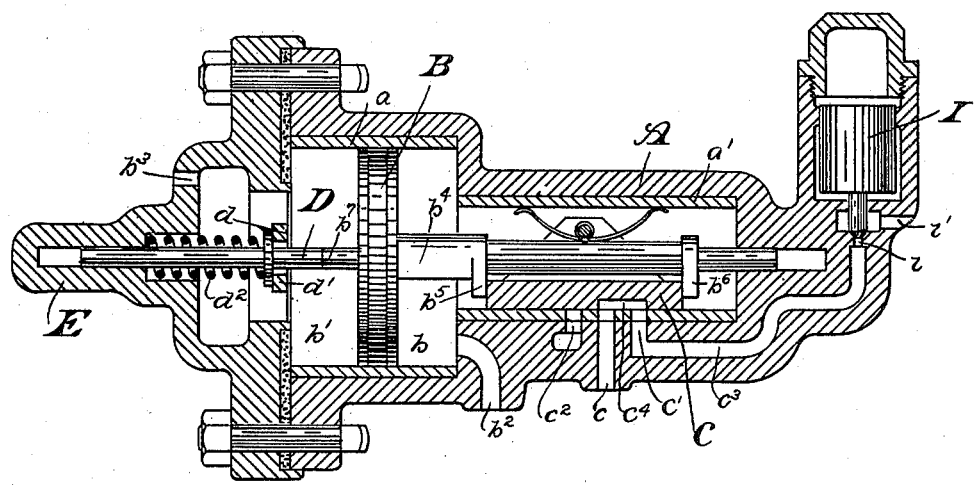
Figure 2:
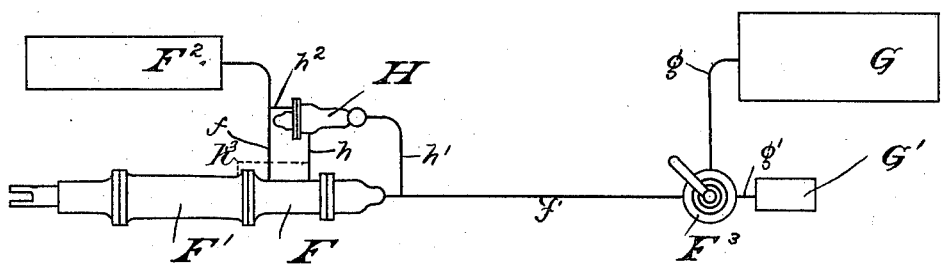

In the drawings, Figure 1 is a vertical sectional elevation, and Fig. 2 a diagrammatic view, showing an air-brake system including my improved valve.

In the air-brake system now in use the triple valve is connected between the train-pipe, the auxiliary reservoir, and brake-cylinder, so that the fluid-pressure has to pass through this triple valve before it can reach either the auxiliary reservoir or the brake-cylinder. The normal or air pressure in the train-pipe is generally about seventy pounds per square inch, and a reduction of from six to eight pounds by the engineer or in any other manner in the train-pipe operates the triple valve, so that the air passes from the auxiliary reservoir into the brake-cylinder and operates such cylinder to apply the brakes. This is the ordinary method. In the case where an emergency-stop is made a further or quicker reduction of pressure in the train-pipe of ten or twelve pounds will further actuate the triple valve, so that the air from the train-pipe will enter the brake-cylinder directly and be added to the pressure from the auxiliary reservoir and apply the brakes more speedily. When it is desired to release the brake mechanism, the normal pressure is restored to the train-pipe, and this action operates the triple valve to close all communication between the train-pipe and the brake-cylinder and open the passage between the auxiliary reservoir and the train-pipe to restore the pressure in the auxiliary reservoir to the normal amount. This operation of the triple valve also opens an exhaust-port in the triple valve, so that the air in the brake-cylinder may escape through it into the atmosphere. In going downgrade it is desirable to retain a certain amount of pressure in the brake-cylinder, so that the engineer may keep the train under better control and not have to continually withdraw pressure from the auxiliary reservoir to keep the desired pressure in the brake-cylinder. At present this pressure is maintained in the brake-cylinder by connecting the exhaust of the triple valve with what is known as a "retaining-valve," located generally at the top of the car and so arranged as to be within easy reach of the train-hands. Ordinarily this valve is arranged so that the air exhausts into the atmosphere; but when it is desired to use this valve to keep a certain amount of air-pressure in the brake-cylinder the cock is turned so that the air is exhausted through a weighted valve, the weight being of any amount desired, but generally sufficient to retain a pressure of fifteen pounds. As the air exhausts it will raise the retaining-valve and escape until the pressure in the brake-cylinder is reduced to the point of about fifteen pounds and will maintain that pressure in the brake-cylinder. The objection, however, to this method of maintaining the pressure in the brake-cylinder is that while the engineer is responsible for running his train he does not have all the parts of the brake mechanism under his absolute control, as he is dependent upon the careful attention of the train-hands, who must, in conjunction with him, operate this retaining-valve to maintain the desired pressure. Should the train-hands through carelessness or otherwise neglect to close the retaining-valve at the desired time, the liability of causing an accident is magnified, as the engineer has not the full control of his train. To remove these objections and to provide a suitable valve which will permit the air under pressure in the brake-cylinder to be exhausted into the outer air either through a free opening or through a retaining-valve which will operate automatically and is at all times under the control of the engineer is the principal object of my invention.

In constructing my improved valve I provide a main shell A, having the bushings $a$ and $a'$. Working within the bushing $a$ is the piston B. The chamber $b$ on one side of the piston is connected with the train-pipe by the opening $b^2$, and the chamber $b'$ on the other side of the piston with the auxiliary reservoir by the opening $b^3$. The piston-stem $b^4$ has two flanges $b^5$ and $b^6$, between which rests the slide-valve C and which impart the motion of the piston to such valve. This valve, which works in the bushing $a'$, governs ports $c$, $c'$, and $c^2$ by a chamber $c^4$ in its under side. $c$ connects with the exhaust from the triple valve, $c'$ with the retaining-valve I by the channel $c^3$, and $c^2$ leads directly to the atmosphere. The chamber $b'$ contains an auxiliary stem D, which has a collar $d$, pressed against an abutment $d'$ by a spring $d^2$, and such plunger has a bearing and guide in the cap E and by the resistance of the spring forms a check to the motion of the piston toward the left when in the position shown.

In Fig. 2 I have shown a diagrammatic view of an air-brake system in which F is a triple valve connected directly to a brake-cylinder F′ and by pipes $f$ to the auxiliary reservoir $F^2$. $F^3$ is the engineer's valve, which is connected with the triple valve by the pipe $f'$ and with the main reservoir G by the pipe $g$. The engineer's valve is also connected, by means of the pipe $g'$, with the brake-valve reservoir G′. H represents my auxiliary valve, which is connected with the triple-valve exhaust by means of the pipe $h$. The train-pipe $f'$ connects with the opening $b^2$ by the pipe $h'$ and auxiliary-reservoir pipe $f$ to opening $b^3$ by pipe $h^2$. A modified form of this arrangement could be made by connecting port $c$ directly with the brake-cylinder and omitting the exhaust feature from the ordinary triple valve. In such a construction the exhaust-port of the triple valve would be plugged up or omitted altogether and the pipe $h$ would be connected to the brake-cylinder instead of to the triple valve, as indicated in dotted lines at $h^3$ in Fig. 2 of the drawings.

I do not think it necessary or desirable to fully show and describe all the mechanism of the triple valve, the engineer's valve, the brake-cylinder, and connection with the brakes, as they form no novel element of my improvement, and as their mechanism and construction is fully understood by those skilled in the art any detailed description here would be superfluous.

The operation of my improvement is as follows: The engineer applies his brakes in the usual manner by making a reduction in the train-pipe pressure. The preponderance of pressure on the left-hand side of piston B causes it and its valve C to move to the right, shutting off any connection between the ports $c$, $c'$, and $c^2$, and hence with the outer air. If now it is desired to retain a slight pressure in the brake-cylinder, the pressure in the train-pipe is raised a certain amount—six or eight pounds. In the ordinary air-brake system this is sufficient to actuate the triple valve to allow the pressure in the brake-cylinder to pass out at the exhaust-port of the triple valve. In my improvement the exhaust is conducted to the port $c$ by this operation of the triple valve, and the pressure in the chamber $b$ being superior to that on the other side of the piston B causes it and its valve to move to the left until its knob $b^7$ strikes the auxiliary stem D, when the resistance of the spring $d^2$ prevents further travel. Port $c$ then being brought into connection with $c'$ by chamber $c^4$ in the under side of the slide-valve, the exhaust from the brake-cylinder passes through the channel $c^3$ and lifting-valve I and passes through $i$ and $i'$ to the air until about fifteen pounds is left in the brake-cylinder. This pressure not being sufficient to raise valve I it closes and prevents further escape of pressure. To effect a complete release of the brakes, a greater increase of pressure is made in the train-pipe. In this case the pressure in chamber $b$ being sufficient to overcome the resistance of spring $d^2$, the piston travels farther to the left until ports $c$ and $c^2$ are placed in communication, which allows a direct escape of pressure from the brake-cylinder to the atmosphere.

From the above it will be seen that the advantages of my improvement are that the engineer through his ordinary engineer's valve may always have the entire train under control, either keeping it free from any brake-pressure or retain a desired pressure in the brake-cylinders to prevent accident when going downgrade. Thus instead of having several persons responsible for the safe operation of the brakes it is under one responsible head and generally a man skilled in the use of such mechanisms, so that it may safely be left to his control.

While I have described my invention with considerable minuteness as regards the details thereof and as being embodied in more or less precise form, I do not desire to be limited thereto unduly, as I contemplate all proper changes in form, omission of parts, and the substitution of equivalents, as circumstances may suggest or necessity render expedient.

I claim—

1. In an automatic air-brake system, the combination, with a train-pipe, an auxiliary reservoir, a brake-cylinder, and a triple valve, of a valve device for controlling the release of air from the brake-cylinder and having connections to the train-pipe, to auxiliary reservoir and to the brake-cylinder, and means connected therewith for retaining a predetermined pressure in the brake-cylinder, whereby the fluid under pressure in the brake-cylinder may be released through the retaining device or directly to the atmosphere by variations in the travel of the piston of the valve device.

2. The combination of an air-brake system, provided with a source of air-pressure, an engineer's valve, a triple valve, a brake-cylinder, an auxiliary reservoir and train-pipe, with an auxiliary valve provided with a casing containing a piston whose traverse in one direction prevents all escape of pressure from the brake-cylinder, and whose partial traverse in the opposite direction allows all but a predetermined amount of pressure to escape from the brake-cylinder, and whose further traverse in the latter direction allows all pressure to escape from the brake-cylinder, substantially as described.

3. The combination of an air-brake system, provided with a source of air-pressure, an engineer's valve, a triple valve, a brake-cylinder, an auxiliary reservoir and train-pipe, with an auxiliary valve provided with a casing containing a piston working in a cylindrical chamber therein, such chamber adapted to be connected on one side of such piston with the train-pipe, and on the other side with the auxiliary reservoir, a valve or valves connected with such piston; such piston and valve or valves adapted to be actuated by train-pipe pressure to prevent any escape of pressure from the brake-cylinder when the train-pipe pressure is reduced, to allow all but a predetermined amount of pressure to escape from the brake-cylinder when the train-pipe pressure is increased a certain amount, and to allow the escape of all pressure from the brake-cylinder when the train-pipe pressure is increased a greater amount, substantially as described.

4. In auxiliary valves for air-brake systems, the combination of a casing, a piston fixed upon a stem and working in a chamber therein, such chamber on one side of such piston adapted to be connected to the train-pipe, and on the other side with the auxiliary reservoir, a valve moving with the piston-stem and governing ports and passages in the casing leading, to connections with the brake-cylinder exhaust, to the atmosphere, and to a retaining-valve, and a gravity or retaining valve governing a port or passage to the atmosphere, substantially as described.

5. In auxiliary valves for air-brake systems, the combination of a casing, a piston fixed upon a stem and working in a chamber therein, such chamber on one side of the piston adapted to be connected with the train-pipe, and on the other side with the auxiliary reservoir, a valve moving with the piston-stem, and governing ports and passages in the casing leading to connections with the brake-cylinder exhaust, to the atmosphere and to a retaining-valve, such retaining or gravity valve governing a port or passage to the atmosphere, an auxiliary stem mounted in the cap of the casing in position to be moved longitudinally by the piston-stem in the latter portion of its traverse in the direction required to release the brakes, and a spring bearing against a collar on the auxiliary stem and against a fixed abutment, substantially as described.

6. The combination of an air-brake system provided with a source of air-pressure, an engineer's valve, a triple valve, a brake-cylinder, an auxiliary reservoir and train-pipe, with an auxiliary valve provided with a casing, a piston fixed upon a stem and working in a chamber therein, such chamber on one side of the piston adapted to be connected with the train-pipe, and on the other side with the auxiliary reservoir, a valve moving with the piston-stem, and governing ports and passages leading to connections with the brake-cylinder exhaust, to the atmosphere, and to a retaining-valve, such retaining or gravity valve governing a port or passage to the atmosphere, an auxiliary stem mounted in the cap of the casing in position to be moved longitudinally by the piston-stem in the latter portion of its travel in the direction required to release the brakes, and a spring bearing against a collar on the auxiliary stem and against a fixed abutment, said combination such that when the train-pipe pressure is reduced said piston-stem and valve act to close all ports and passages in said auxiliary valve to and from the atmosphere, from the brake-cylinder exhaust, and to the retaining-valve respectively; that when the train-pipe pressure is raised a certain amount said piston-stem and valve act to close all ports and passages from brake-cylinder exhaust direct to the atmosphere, and to connect the port to the brake-cylinder exhaust with the port to the retaining-valve, and that when the train-pipe pressure is raised a greater amount said piston-stem and valve act to connect the port to the brake-cylinder exhaust with the port direct to the atmosphere, substantially as described.

HENRY F. NOYES.

Witnesses:
R. F. PEABODY,
F. W. JOSLYN.